April 15, 1969  W. A. WHITFILL, JR  3,439,319

MARINE SEISMIC CABLE WITH DEPTH DETECTOR SYSTEM

Filed Aug. 7, 1968

William A. Whitfill, Jr.
INVENTOR.

United States Patent Office 3,439,319
Patented Apr. 15, 1969

3,439,319
MARINE SEISMIC CABLE WITH DEPTH DETECTOR SYSTEM
William A. Whitfill, Jr., Houston, Tex., assignor to Schlumberger Technology Corporation, New York, N.Y., a corporation of Texas
Filed Aug. 7, 1968, Ser. No. 750,984
Int. Cl. H04b 13/02
U.S. Cl. 340—7                    6 Claims

ABSTRACT OF THE DISCLOSURE

A marine seismic cable system which is adapted for towing behind a boat, employs a depth detector system operating entirely from alternating current. The cable includes electrical conductors coupled to depth sensors located at spaced points along the cable. The depth sensors and electrical means provide a D.C. current signal representative of depth which controls a pulse rate generator to provide modulated pulse rate signals for cable transmission. A shipboard power oscillator supplies alternating current energy via the cable conductors to the electrical means in the cable. Also, at the ship, the pulse rate signals are reconverted to D.C. current and displayed.

Background of the invention

This invention relates to marine seismic systems, and more particularly, to a marine seismic cable employing apparatus for determining the depth in the water of the seismic cable at a plurality of points along the length of the cable.

In performing seismic explorations beneath the surface of the water, it is conventional practice for ships to tow long seismic streamer cables behind them in the water. These cables generally carry detector apparatus such as seismic transducers or hydrophones which detect reflected wave energy and provide signals representative thereof. A sound source such as dynamite is utilized to introduce an acoustical wave front into the earth formations underlying the body of water being explored and the hydrophones pick up seismic waves reflected from geological structures in the underlying formations. Cables utilized for this purpose may typically be several thousand feet long and comprise many sections of cable coupled in end to end relation. The cables are usually constructed so as to have a neutral buoyancy in the water. However, because of variations in temperature and salinity of the water (the cable's density being constant), it may be difficult to achieve a neutral buoyancy and different portions of the cable may tend to rise or sink to different depths.

In some applications, it is very important to maintain the entire length of the cable at a constant depth. This may be necessary in order to utilize the reflection of seismic waves from the surface of the water to enhance and increase the signal strength of waves detected by the hydrophones or in order to easily interpret the reflected seismic waves.

In other applications, maintaining the cable at a constant depth may not be imperative because the interpretation of the reflected seismic waves received by the hydrophones may be processed, as for example by a computer program, to take into account variation in cable depth. However, in either case it is very important to know accurately the depth of the cable along its length either in order to control it or take it into account in interpreting the reflected seismic wave data.

Prior art devices for measuring the depth of the cable have been incorporated in the cable structure. Such prior art devices have typically included D.C. powered, pressure sensitive transducers of the potentiometer variety wherein a constant D.C. voltage is applied across the resistive sensor element of the transducer. The pressure sensitive portion of the transducer may comprise the variable wiper arm of the potentiometer and hence the output voltage appearing between the ground potential side of the resistive element and the wiper arm is directly proportional to the depth of the pressure sensor, and hence the portion of the cable containing the device.

Because the cables used in marine seismic work are typically thousands of feet long, a relatively high D.C. voltage source situated on the towing boat has heretofore been used in order to account for voltage drops due to the conductor resistance in the cable. The use of such relatively high D.C. voltages to activate the depth sensors in the cable has had several disadvantages. For one thing, although the cable is sealed from the salt water environment in which it is used and filled with oil, it has been almost impossible to prevent some salt water seepage from entering the cable. If this occurs, the accuracy of the depth detector system is affected, because any salt water present inside the cable acts to short the D.C. high voltage lead to its ground return path. This effectively places a random resistance in parallel across some of the depth sensors and thus a predictable voltage across the sensor is not provided. If this occurs, the calibration of the depth sensor is lost.

Moreover, a D.C. current leakage through the salt water which contaminates the cable can get into the hydrophone leads which run the entire length of the cable and can affect the accuracy of the hydrophone output since the hydrophone signal levels are very low, typically of the order of microvolts. Thus only a slight amount of salt water present in the cable when utilizing a relatively high D.C. voltage to power the depth detectors can superimpose a relatively low frequency varying D.C. component on the hydrophone outputs and mask their signals Also, the presence of DC. voltage on any of the conductors carried by the cable can cause electrolysis both on the metallic cable connectors and the wiring carried within the cable. If this occurs, serious corrosion problems can affect the cable wiring and metallic connectors used to join sections of the seismic cable.

Accordingly, it is an object of the present invention to provide a new and improved seismic cable having a depth detector system which obviates the foregoing difficulties. A depth detector system in accordance with this invention is powered entirely by A.C. and does not utilize D.C. voltages carried by the seismic cable.

Summary of the invention

In accordance with the present invention, a marine seismic cable is employed which utilizes a novel depth detector system. This system comprises a plurality of depth detector devices placed at intervals along the length of a marine seismic cable. The cable also carries a plurality of seismic wave transducers, or hydrophones distributed along its length.

Each depth detecting device utilizes a potentiometer type pressure sensitive transducer. A power oscillator on shipboard generates a square wave, which may be of a frequency of roughly 1000 Hertz, which is carried down the cable to an individual power supply at each depth detector section. The power supply rectifies and filters the A.C. power from the source and provides D.C. power for application to the depth sensor and other circuitry used in the depth detector section. The output from the sensor is utilized to control the frequency of a pulse generator. This pulse generator generates current pulses of, for example, approximately 10 volts amplitude whose pulse rate is directly proportional to the input voltage applied to it by the pressure sensor. The output of the pulse generator is conducted back along the seismic cable through another conductor and returns to the ship where a pulse rate to D.C. converter circuit is utilized to convert the pulses back to D.C. The D.C. signal is then displayed in a conventional manner.

The novel features of the present invention are set forth with particularity in the appended claims. The present invention, both as to its organization and manner of operation together with further objects and advantages thereof may best be understood by way of illustration and an example of an embodiment when taken in conjunction with the accompanying drawings.

Figure 1:
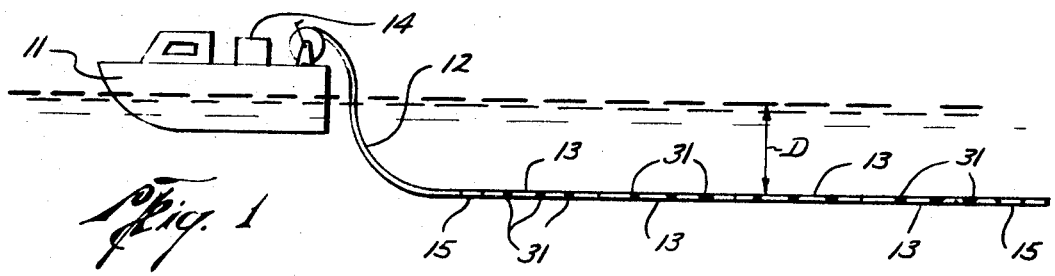
FIG. 1 is a schematic view showing a seismic cable being towed through the water behind a boat.

Referring initially to FIG. 1, a boat 11 is shown towing a marine seismic system 12 comprised of a number of sections 13 of seismic cable. Depth detector stations 15 are disposed along the length of cable 12 in order to provide accurate depth determinations of portions of cable 12, thus providing information on the depth of the cable throughout its length. Signals from the depth detector stations 15 are carried back through plural conductors in the cable and displayed on shipboard apparatus 14. In this manner, the operator is continuously provided with selective measurements at various points along the cable of its depth, D, below the surface of the water. Hydrophones 31 along the length of the cable are used to detect seismic wave reflections.

Figure 2:
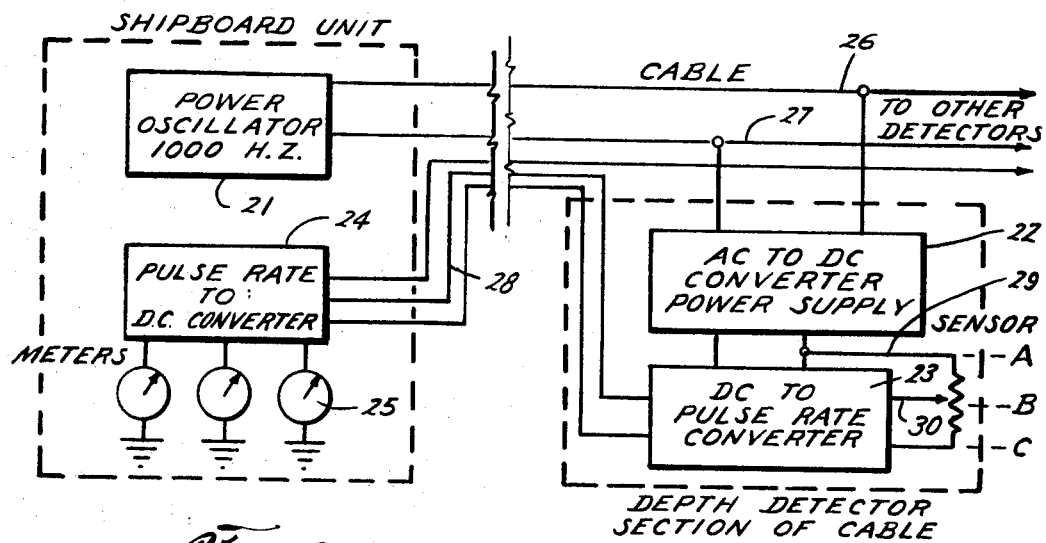
FIG. 2 is a block diagram detailing the operation of one of a plurality of depth detector sections utilized in the present invention.

Referring now to FIG. 2, one channel of a multichannel depth detector system is shown. A power oscillator 21, located aboard the ship, generates a 1000 Hertz square wave of roughly 36 volts RMS amplitude which is used to power the depth detector sections used in the cable. The square wave is transmitted via conductors 26 and 27 connected to a depth detector section in the cable. A.C. to D.C. converter 22 rectifies and filters the 1000 Hertz square wave and provides a constant D.C. power source (of approximately 10 volts) on conductor 29 to the potentiometer type depth sensor 36.

The constant voltage source is applied between points A and C of sensor 36. Wiper arm 30 of sensor 36 is responsive in direct proportion to the pressure surrounding the sensor and thus the voltage between points A and B on the sensor is directly proportional to the depth of that particular cable depth detector section. The sensor output voltage between points A and B is applied to a D.C. to pulse rate converter element as, for example, a variable frequency, sinusoidal oscillator or an astable multivibrator. The output of this converter can be, for example, a 10 microsecond wide pulse of approximately 10 volts amplitude and whose pulse rate is directly proportional to the voltage applied across its input terminals and hence directly proportional to the depth of the depth detector section. Thus the sensor output is converted to a pulse rate modulated signal which is carried back along conductor 28 of the cable to the shipboard unit.

When the signal reaches the ship, it is applied to the input terminal of pulse rate to D.C. converter 24. This unit could comprise, for example, a filter circuit which converts the pulse rate to a D.C. voltage which is directly proportional to the pulse rate. This D.C. voltage output is then applied to a recording means such as a meter 25. Alternatively, a digital counter could be utilized to count the pulses.

From the foregoing, it will be appreciated that all signals on the seismic cable conductors are alternating current signals. Although the sensor portion of the depth detector system operates from D.C. voltages, these voltages are supplied, in situ, in the cable by A.C. to D.C. converter power supply 22. The sensor output which is also a D.C. voltage is converted, in situ, in the cable by D.C. to pulse rate converter 23 to a pulse rate modulated signal which is carried along conductor 28 and back to the shipboard unit.

The complete removal of D.C. voltages from the seismic cable obviates many of the difficulties previously described. Although some of the 1000 Hertz power signal may be inductively or capacitively coupled to the hydrophone leads, this frequency is so far removed from the frequencies of interest in the hydrophone output that it is quite easily removed by filter techniques at the seismic hydrophone detector and recorder portion of the shipboard unit.

Figure 3:
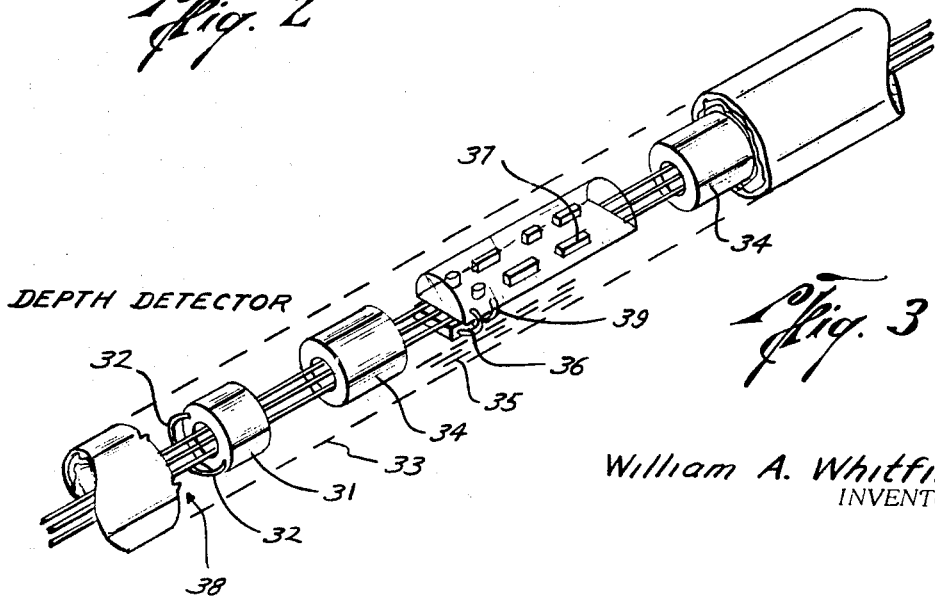
FIG. 3 is a perspective, partially sectioned view of a portion of the seismic cable of the present invention showing a depth detector section of the cable.

Referring now to FIG. 3, a sectional schematic view of the seismic cable embodying applicant's invention is shown. One of the plurality of hydrophones 31 is shown and the output from this hydrophone is taken by leads 32 to a wiring bundle 38 which passes down the center of the cable. Plastic constructed spacers 34 are disposed at intervals along each cable section to retain the cylindrical shape of the cable. The cable's interior is filled with an electrically non-conducting substance 35 such as oil. The depth detector section of the cable contains solid state circuitry 37 packaged or enclosed in polyurethane. Circuitry 37 consists of A.C. to D.C. power converter supply 22 and D.C. to pulse rate converter 23 as shown in FIG. 2. The sensor 36 is connected to the solid state circuitry package 37 by conductors 39.

Other depth detector cable sections 15 operate precisely as the one discussed in the above specification, each carrying its output signal along separate conductors in wiring bundle 38 down the center of the cable back to the shipboard units.

While one particular embodiment of the present invention has been shown and described, it is apparent that changes may be made without departing from this invention in its broader aspects and therefore, the aim in the appended claims is to cover all such changes and modifications as fall within the true spirit and scope of this invention.

What is claimed is:

1. A cable for use in marine seismic surveying comprising:
    a cable section including a plurality of electrical conductors, means disposed at intervals along said cable section for detecting pressure as a function of depth in a body of water, means in said cable section coupled to said pressure detecting means for developing a D.C. current signal in response to pressure, means in said cable section responsive to D.C. current signals for developing a modulated A.C. signal in response to a D.C. current signal, and electrical conductor means for transmitting said A.C. signal along said cable section.

2. The cable of claim 1 and further including means in said cable section connected to a pair of electrical conductors for converting A.C. power supplied on said pair of conductors, to D.C. power for energizing said means for developing a modulated A.C. signal.

3. The cable of claim 1 wherein said means for developing a modulated A.C. signal develops a pulse rate modulated signal whose pulse rate is modulated in proportion to the magnitude of said D.C. current signal.

4. The cable of claim 1 and further including a plurality of seismic wave detecting means carried by said cable body and distributed along its length, together with conductor means for transmitting signals developed in said seismic wave detecting means.

5. In a marine seismic surveying system, the combination comprising:
    a shipboard A.C. power source;

a marine seismic cable coupled to said A.C. power source including;
a plurality of cable sections coupled in end to end relations;
means carried in said cable sections for detecting seismic waves reflected from subterranean formations and for generating electrical signals representative thereof;
means disposed at intervals along said cable for measuring the depth in a body of water of said cable, said means including;
means carried in said cable for converting A.C. power supplied by said shipboard A.C. power source to D.C. power to power said depth detecting means;
pressure detecting means for developing a D.C. current signal representative of the pressure about said pressure detecting means;
means responsive to said D.C. current signal for developing a pulse rate modulated signal in response to said D.C. current signal;
conductor means for transmitting said pulse rate modulated signals back along said cable to a ship; and
shipboard means for displaying and recording said pulse rate modulated signals and said signals representative of reflected seismic waves.

6. A marine seismic cable depth detecting system comprising:
a shipboard A.C. power source;
means in said cable for converting A.C. power from said A.C. power source to D.C. power for operating depth detecting apparatus;
depth detecting apparatus including a pressure sensitive, D.C. powered transducer which generates a D.C. signal representative of pressure about said transducer, and means for generating a pulse rate modulated signal whose pulse rate is proportional to said D.C. signals, togther with means for transmitting said pulse rate modulated signal back to shipboard recording apparatus; and
shipboard recording apparatus including means for demodulating said pulse rate modulated signal and means for displaying depth information represented by said signal.

References Cited

UNITED STATES PATENTS 3,308,425   3/1967   McLoad.

RODNEY D. BENNETT, JR., *Primary Examiner.*

D. C. KAUFMAN, *Assistant Examiner.*

U.S. Cl. X.R.

114—235